No. 755,191. PATENTED MAR. 22, 1904.
T. L. VALERIUS.
CONTINUOUS PASTEURIZER.
APPLICATION FILED AUG. 28, 1902.
NO MODEL. 4 SHEETS—SHEET 1.
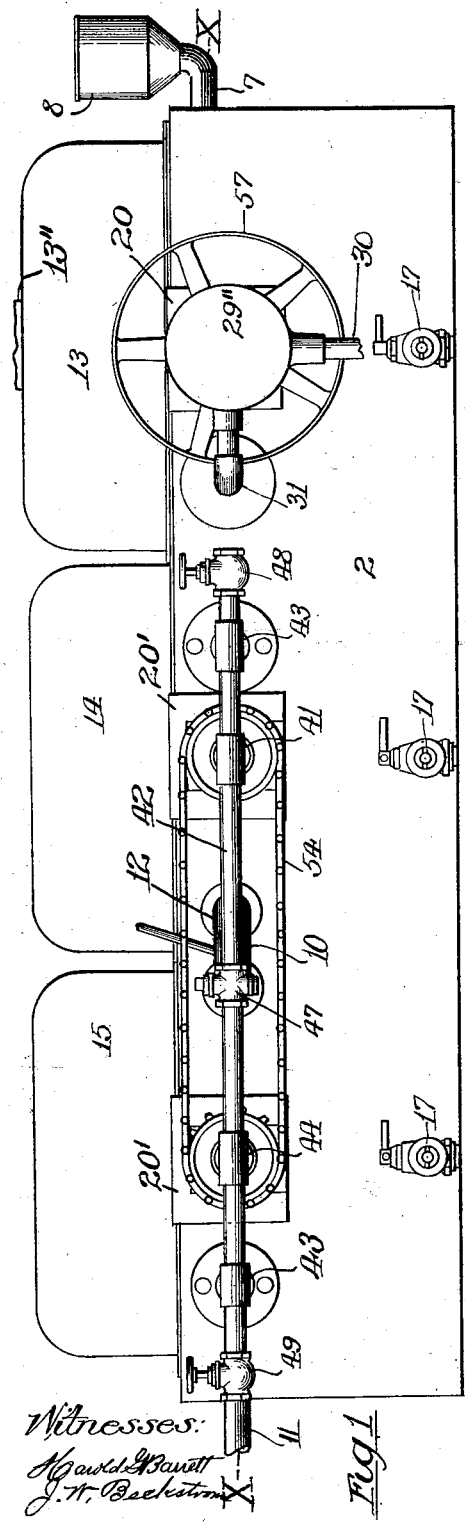
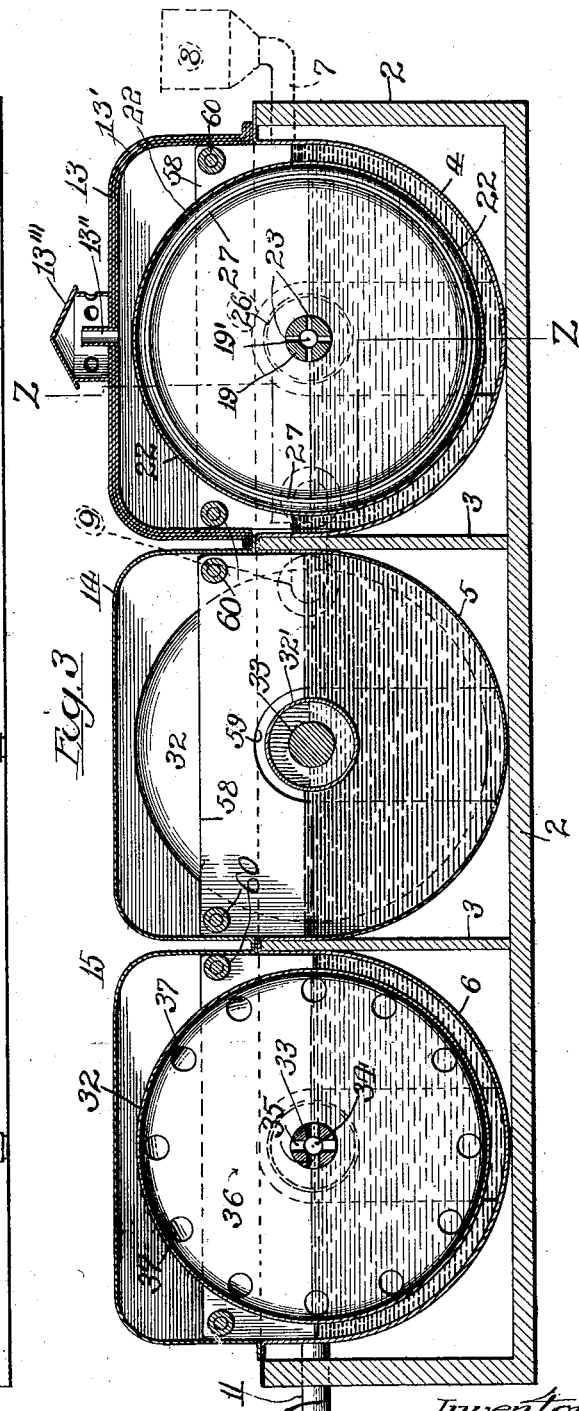

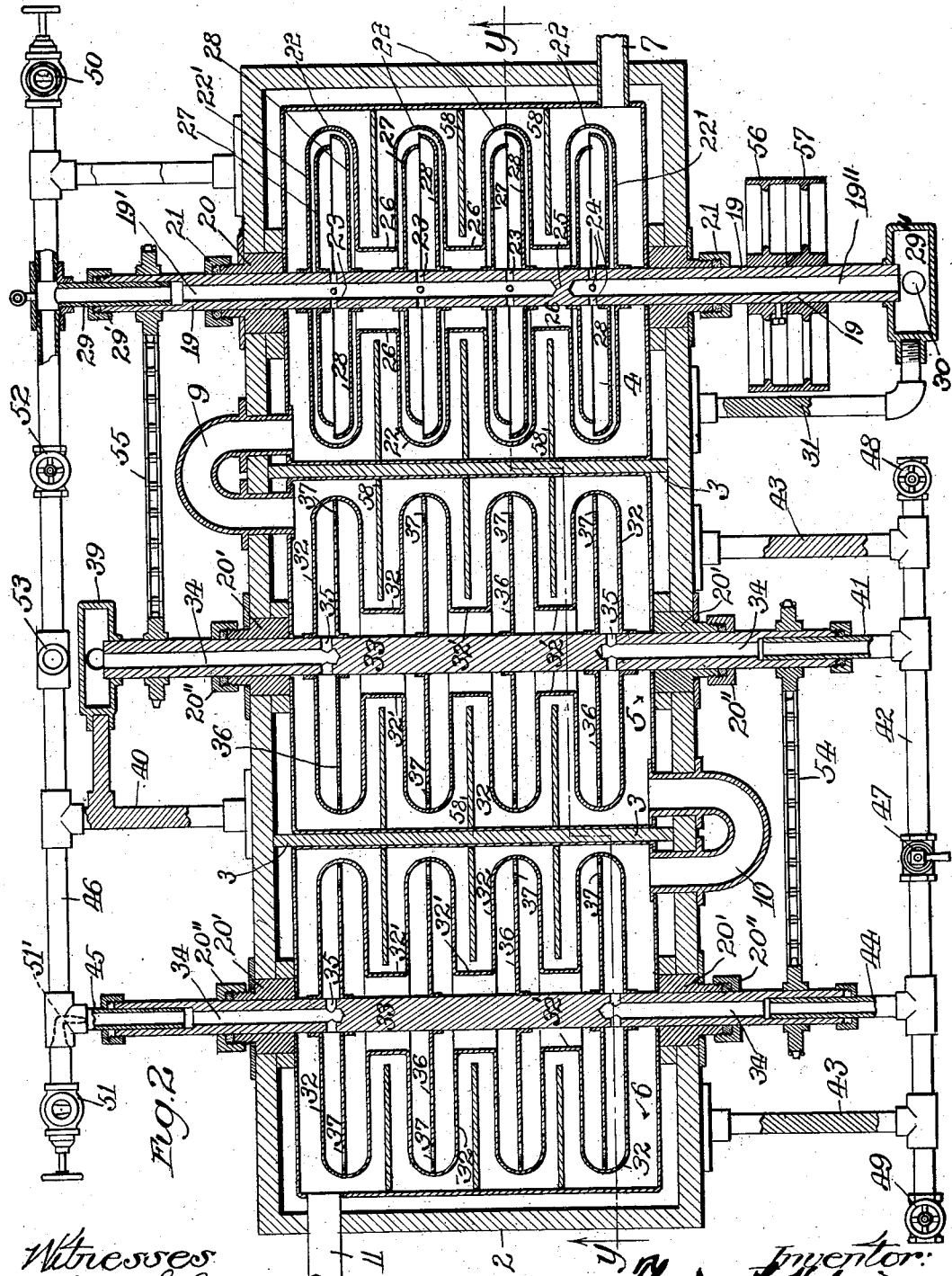

No. 755,191. PATENTED MAR. 22, 1904.
T. L. VALERIUS.
CONTINUOUS PASTEURIZER.
APPLICATION FILED AUG. 28, 1902.
NO MODEL. 4 SHEETS—SHEET 3.
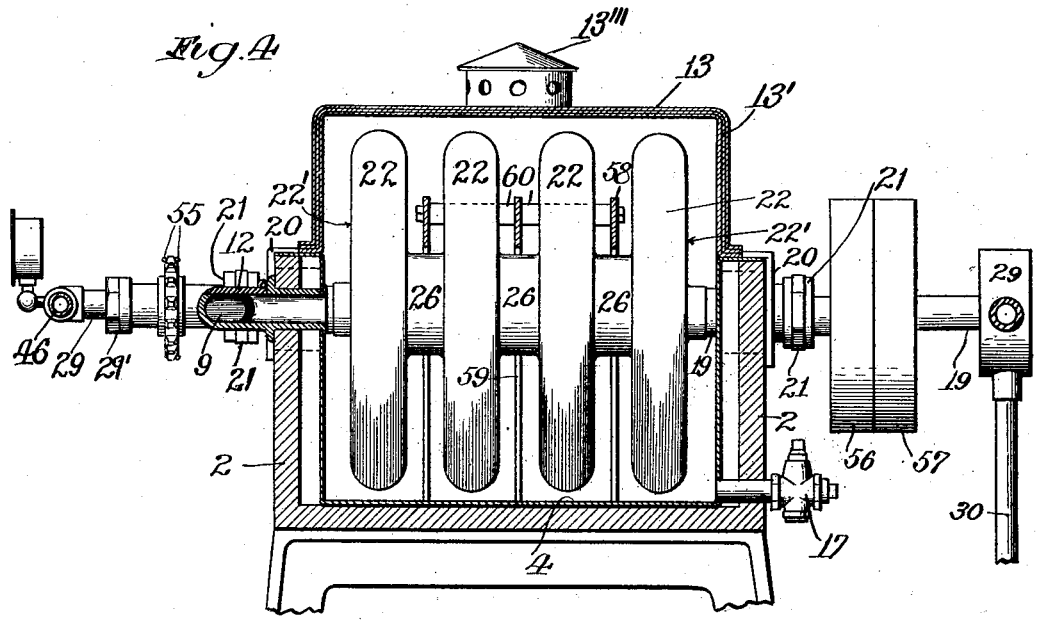
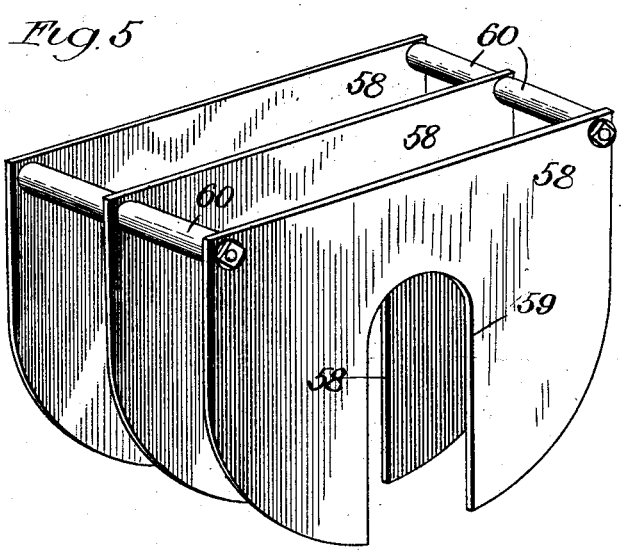

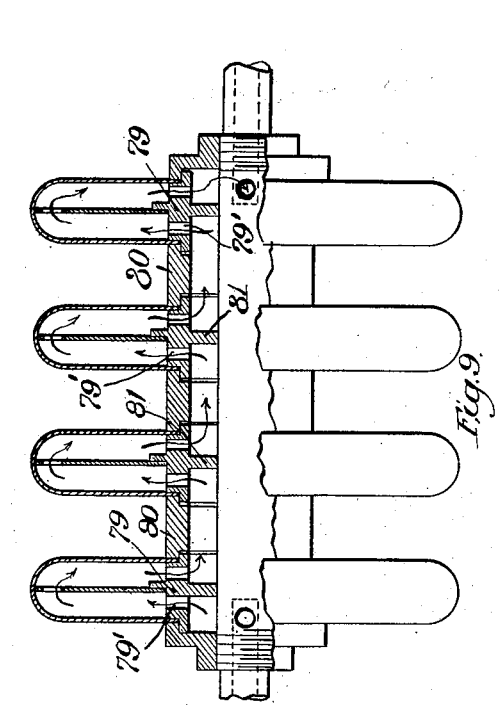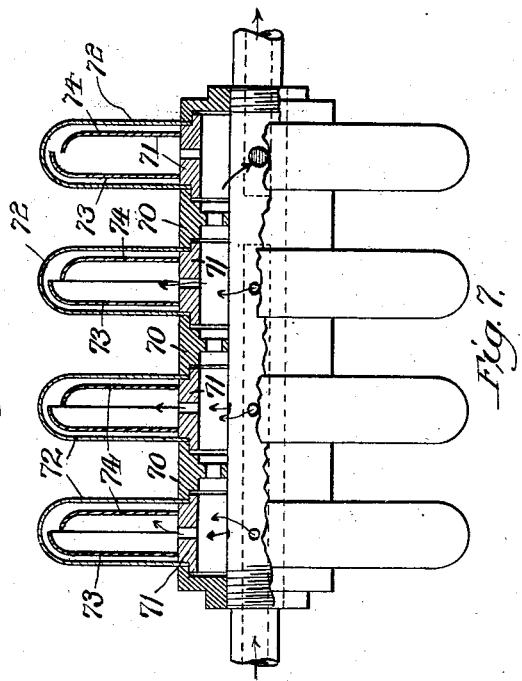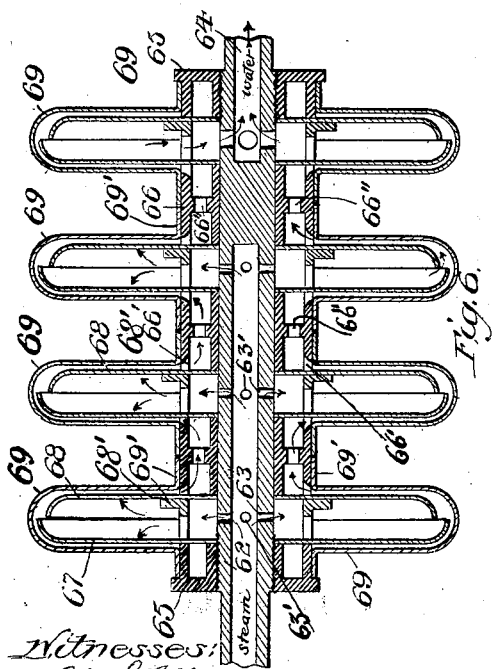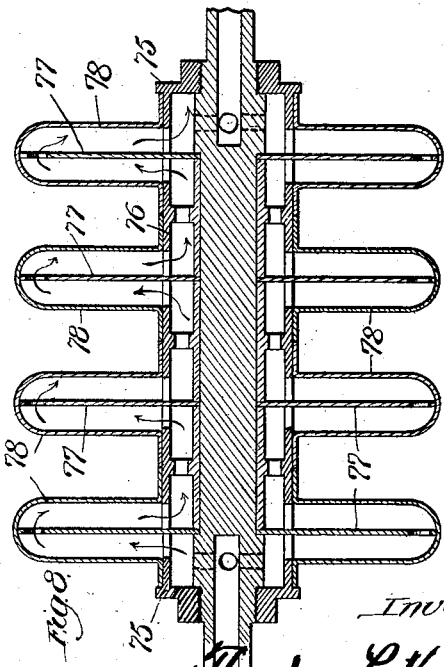

No. 755,191. Patented March 22, 1904.

UNITED STATES PATENT OFFICE.

THEODORE L. VALERIUS, OF FORT ATKINSON, WISCONSIN, ASSIGNOR TO CREAMERY PACKAGE MFG. CO., OF CHICAGO, ILLINOIS, A CORPORATION OF ILLINOIS.

CONTINUOUS PASTEURIZER.

SPECIFICATION forming part of Letters Patent No. 755,191, dated March 22, 1904.

Application filed August 28, 1902. Serial No. 121,281. (No model.)

*To all whom it may concern:*

Be it known that I, THEODORE L. VALERIUS, a resident of Fort Atkinson, Jefferson county, Wisconsin, have invented a certain new, useful, and Improved Continuous Pasteurizer, of which the following is a specification.

My invention relates to a machine for pasteurizing, heating, tempering, and cooling milk and other liquids; and the object of my invention is to provide a machine wherewith the process of pasteurizing, tempering, and cooling milk and other liquids may be conducted continuously, and at a more rapid rate than has hitherto been successfully attained. Most of the pasteurizers which have been devised up to this time have been large and bulky and the process or period of pasteurization of fluids thereby has, as I think, been needlessly long. The extermination of bacilli and microbes by quick variations of temperature in a body of liquid depends, I believe, not so much upon the duration of the high temperature as it does upon the imparting of a high temperature to every portion of the body of liquid under treatment and the quickness with which the temperature of the liquid is thereafter reduced. In other words, I find that by exposing the liquid to heated surfaces that in area largely exceed the heated areas of like machines in proportion to the quantity of fluid under treatment I am able to very quickly raise the temperature of a flowing stream of milk or other liquid and by like exposure thereof to cooling-surfaces quickly reduce its temperature.

Another object of my invention is to provide a machine for carrying out various processes of pasteurizing, tempering, and cooling or treating liquids, particularly milk and cream, and which will perform its function perfectly in a substantially closed condition, whereby loss of liquid by evaporation is avoided and exposure thereof to the atmosphere is obviated.

Another object of my invention is to provide a machine of the class mentioned which shall be compact in form and neat in appearance, which may be easily cleaned, which shall be of low cost as to manufacture, maintenance, and operation, which shall be automatic in operation, and which shall require little attention of the users.

My invention consists generally in a machine or apparatus particularly adapted for heating or cooling, pasteurizing or tempering liquids, especially milk and cream, and which is of the construction and combination of parts hereinafter described, and pointed out in the claims.

The invention will be more readily understood by reference to the accompanying drawings, and in which—

Figure 1 is a side elevation of a continuous pasteurizer embodying my invention. Fig. 2 is a horizontal section thereof on the line $x$ $x$ of Fig. 1. Fig. 3 is a vertical section on the irregular section-line $y$ $y$ of Fig. 2. Fig. 4 is a transverse vertical section substantially on the line $z$ $z$ of Fig. 3. Fig. 5 is a perspective view of one of the groups of deflecting-plates which I preferably provide in each compartment of the machine. Fig. 6 is a sectional detail illustrating a modification of the rotary heater. Fig. 7 illustrates a further modification thereof. Fig. 8 is a sectional detail of a modified form of the rotary cooler, and Fig. 9 illustrates another modification of the rotary cooler.

As shown the drawings, the body of the machine comprises a long deep frame or box 2, divided by partitions 3 3 into three compartments 4, 5, and 6, defined by the three metal linings, the bottoms of which are semicylindrical. This construction of the bottoms of the compartments facilitates the cleaning of the vessels or compartments and makes the bodies of liquid in the compartments substantially coextensive with the rotary heating and cooling devices therein. Each of these rotary devices, as hereinafter described in detail, comprises a plurality of hollow disks, and said devices extend transversely across the box or frame 2 or of the machine.

The milk or other liquid is supplied to the machine through the inlet 7, which has a receiving-funnel 8. The inlet-pipe 7 enters one corner of the compartment 4. Diagonally across the compartment is the outlet or bypass 9, which leads into the next compartment 5, and diagonally opposite the by-pass 9 is the by-pass 10, leading from the compartment 5 into the compartment 6.

11 is the discharge-pipe, which is diagonally opposite the by-pass 10.

The pipe 7, the by-pass 9, the by-pass 10, and the discharge-pipe 11 are preferably arranged at successively lower points to promote the flow of the liquid through the compartments from the inlet of the first compartment 4 to the outlet 11. The heights to which the liquid rises in the several compartments is approximately indicated in Fig. 3. The by-passes 9 and 10, as shown, preferably extend outside of the walls of the box 2, and as there is preferably no pressure on the liquid contained in the compartments the by-passes are never more than partially filled with liquid. This being the case the by-passes may have hinged tops 12, which being raised allow the by-passes to be easily and thoroughly cleaned. Each lid or cover 12 is preferably provided with a thermometer-hole to permit the taking of the temperature of the flowing liquid between the compartments.

Covers 13, 14, and 15 are provided for the compartments, and these covers fit tightly enough to practically exclude air from the compartments and prevent atmospheric or accidental pollution of the liquid therein. The compartment 4 is the heating-compartment of the machine, and the cover 13 for this compartment is preferably provided with an asbestos lining 13' to make the same a better non-conductor of heat. The cover, particularly when made in this way, assists in maintaining the temperature within the compartment 4 and by preventing the escape of vapors prevents loss of the fluid by evaporation. Preferably the cover 13 is provided with a small hole 13'' in its top and with the vapor-condensing cap 13'''. The hole 13'' is just large enough to permit the free exit of the ordorous gases which rise from the liquid which is being treated, and this hole being filled by said gases air is excluded. The covers for the other compartments, which are the cooling-compartments, do not require exhaust-openings and serve their purpose best when tight. As shown, the metal compartments 4, 5, and 6 are preferably surrounded by the air-spaces between the same and the box 2.

17 17 17 are the drain-cocks of the several compartments.

The best pasteurization of a liquid, and particularly of milk, involves both its heating and cooling in the one process. This is done in the single machine illustrated.

The heating and cooling of the milk in my machine is accomplished by means of the rotary devices before referred to, the tempering-surfaces of which are very large in proportion to the liquid capacities of their compartments. The rotary heaters and coolers which I employ somewhat resemble the rotary evaporators hitherto employed for the condensation and evaporation of various liquid, but differ therefrom in essential features of construction and arrangement and also in their operation. The rotary heater, which is in the compartment 4, comprises a plurality of hollow disks 22, that are arranged upon a shaft 19. This shaft extends through or across the compartment and, when the compartment is filled, is preferably partly immersed in the liquid therein. The shaft 19 is held in bearings 20 in the upper walls of the box-frame 2 and its metal compartment 4. Each bearing is provided with a stuffing-box 21, surrounding the shaft 19, to prevent leakage of the liquid from the compartment or liquid-space. The steam which is used in the heater enters through one end of the shaft 19 and is discharged from the other end. The shaft is bored from opposite ends, and the bore 19' at the steam end of the shaft is longer than that at the outlet end of the shaft—that is, the bore 19'' at the outlet end extends only far enough to meet the last disk upon the shaft—to wit, that which is nearest the inlet-pipe 7, of the compartment 4. The disks 22 are oblong in cross-section and are preferably made of sheet metal and are fastened about the shaft 19 at regular intervals.

23 represents openings in the shaft leading from the bore 19' into the hollow disks. Similar openings 24 are provided in the opposite end of the shaft, the same leading from the last disk 22 into the outlet-bore 19'' in that end of the shaft. As shown, a partition 25 is left between the bores in the shaft. The several disks are connected by the cylindrical portions 26, that are larger than the shaft 19, and each disk contains two baffle-disks 27 and 28, which are fastened upon the shaft. The baffle disks or plates are of less diameter than the hollow disks, and their edges are preferably turned inwardly, as shown, with an annular opening between the edges of each pair of baffle-disks. It will be noted that the outer sides 22' of the disks 22 at the ends of the heater are alone fastened to the shaft 19 and that between these points the disks are connected by the cylindrical portions 26. The shaft receives steam or other heating fluid from the pipe 29, which is sleeved in the end of the shaft 19, with the joint protected by the stuffing-box or gland 29'. The steam upon entering the bore 19' jets into the hollow disks through the holes 23 and striking the baffle-disks condenses thereon. The water of condensation, which soon fills the lower parts of the disks 22, flows from each disk to the next through the connecting part 26 until it enters the last disk on the shaft, from which it is expelled through the openings 24, leading into the short outlet-bore 19" of the shaft. Traversing this the water is discharged into the head 99", that is supported at the end of the shaft 29 and from the bottom of which extends the drain-pipe 30. The end of the shaft has a running fit in the side of the head 29", and the head is preferably steadied by a bracket 31, extending from the side of the box 2.

The rotary coolers, for the two compartments 5 and 6, are identical in construction, and in external appearance they are preferably identical with the heater. Each cooler is made up of a series of hollow disks 32. The end cooling-disks 32 are in each case connected to a shaft 33, and the intermediate connections are made by cylindrical portions 32', identical with the connections 26, before described. The shaft 33 has a bore 34 at each end, which bores communicate with respective end disks by openings 35. Each disk 32 contains a partition-disk 36, fastened at its center to the shaft 33. The partition-disks may be fastened at their peripheries and are provided with a number of holes 37, for the passage of the cooling fluid. The bearings and stuffing-boxes 20' 20" for the shafts 33 are identical with the boxes 20. The shafts 33 33 are connected by the sprocket-belt 54, while the middle shaft 33 and the shaft 19 are connected by the sprocket-belt 55, on the opposite side of the machine. All of the shafts are driven from the shaft 19, which carries the fixed and loose belt-pulleys 56 and 57.

That end of the middle shaft 33 which is adjacent to the by-pass 9 extends into the discharge-head 39, supported on the bracket 40. The other end of the shaft has sleeve connection 41 with the pipe 42, that is supported by the brackets 43 43. The end shaft 33 has sleeve connections 44 45 with the pipes 42 and pipe 46. These sleeve connections permit the roration of the shafts, while making good joints therewith. The pipe 42 is provided with the intermediate valve 47 and with the end valves 48 and 49. The pipe 46 has the valves 50 and 51 at its ends and an intermediate valve 52.

53 is the water-pipe connection with the pipe 46, the same being located between the valve 52 and the shaft 33 at the end of the machine.

I preferably provide each compartment of the machine with a group of removable deflecting-plates, which in a measure conform to a spiral and cause the milk to progress from the inlet to the outlet of the compartment, slightly increasing the capacity of the machine. These plates 58, as shown in Figs. 2 to 5, have curved bottoms which rest upon the bottoms of the compartments, and said plates are provided with deep notches or recesses 59 of greater width than the cylindrical portions between the disks. The plates 58 are equidistant and are connected at their upper corners by the cross-rods 60. As shown in Fig. 2, the deflecting-plates preferably fit snugly against the side walls of the compartment; but, if desired, openings may be left for the passage of the milk at these points as well as at the centers of the plates. In practice the spaces between the disks and the plates are less than indicated in the drawings, and the plates have a greater tendency to deflect the liquid that is carried over by the revolving disks.

In machines of large size I prefer to strengthen the rotary devices at their hubs or centers, and to this end I sometimes construct the heaters and coolers as represented in Figs. 6 to 9 of the drawings. These illustrations are all exaggerated as to the relative diameters of the parts, and in practice many more disks are arranged upon a single shaft.

Referring to Fig. 6, 62 represents the shaft provided with a steam-bore 63 and with the water-outlet bore 64. The ends of this shaft are threaded, as shown, to receive the collars or rings 65 65. 66 represents other rings, that are slipped onto the shaft 62 and are of the same external diameter as the rings 65. 67 68 are the baffle-disks. The disks 66 are each provided with a serrated ring or collar 68', which extends between it and the opposite disk 67. The collars 68' are preferably of the same diameter as the rings 66. It is obvious that when the rings 65 are screwed inward the baffle-plates will all be firmly bound between the ends of the several rings. The hollow disks 69 are arranged upon the rings 65 66, having flared hubs 69', that fit said rings. The hollow disks are preferably made of sheet metal, and, contrary to the illustrations herein, are preferably made in halves, which are placed together with soldered joints. The shaft 62 has openings 63' leading from the steam-bore 63 into the spaces between the baffle-plates. The spaces between the inner walls of the hollow disks 69 and the baffle disks or plates 67 68 are very narrow, and the water collecting in these spaces and which prevents the scalding of the milk on the disks 69 is discharged into the hubs or rings 66 through the holes or notches 66' therein. As shown, the internal webs of the rings 66 have water-passages 66". The steam entering the bore 63 escapes into the hollow disks and is there condensed, and the water of condensation traverses the narrow spaces between the hollow disks 69 and the baffle-plates 67 68, with a general flow toward the outlet end of the heater. The water of condensation is finally expelled from the last disk into the bore 64. It will be obvious that the direct flow of either steam or water from end to end of the heater is prevented by the steam-condensing baffle-plates, the central parts of which fit closely upon and about the shaft 62.

A further modification of the heater is illustrated in Fig. 7. The shaft here employed is identical with that shown in Fig. 6; but the rings are so constructed as to clamp the hollow disks between them. 70 70 are rings provided with inset shoulders to receive the rings 71, which are provided with outset shoulders to interlock with the rings 70. The edges of the hollow disks 72 are held between the rings 70 and 71, while the baffle-plates 73 74 are mounted upon the rings 71. The rings 70 have holes 70' for the longitudinal passage of steam and water along the shaft, while the rings 71 are provided with a plurality of holes 71' opposite the holes in the shaft and through which steam rises into the tops of the hollow disks between the baffle-plates 73 74 therein. The spaces between the baffle-plates and the inner walls of the disks are so narrow that said spaces will be substantially filled with water at all times by capillary action, thereby interposing a strata or film of water between the steam entering the disks and the exterior surfaces of the disks 72, to prevent overheating of milk in contact therewith.

Fig. 8 shows a water-cooler constructed on the plan of the heater shown in Fig. 6. In this case the end rings 75 75 are made to clamp and hold the middle partitions 77.

A water-cooler resembling the heater in Fig. 7 is shown in Fig. 9, the same comprising interlocking rings 79 and 80 and differing from Fig. 7 only in that the rings 80 have no inner webs, while webs 81 are provided upon the rings 79. The rings 79 are provided with holes 79' on each side of the partition plates or disks, and the course of the water is as indicated by the arrows, the water being forced by the webs 81 to travel around the partitions in the disks before reaching the outlet-hole in the shaft.

Numerous modifications may be made in these rotary devices and in the construction of the machine throughout.

The operation of my continuous pasteurizer is as follows: The steam-pipe is connected to the valve 50, and the water-pipe is connected to the valve 53, suitable means being provided for supplying water or other fluid that has a low temperature. Before beginning the operation the valves 52, 51, 48, and 49 are closed, while the valve 47 is opened to provide a free passage between the ends of the two cooler-shafts 33. The cool water entering the pipe 46 at 53 under a suitable head or pressure flows into the end shaft 33 and enters the first disk of the cooler. The rapidly-flowing stream in the pipe here becomes a slow-flowing stream that moves through the tortuous passages of the connected disks of the cooler and finally reaching the discharge end of the shaft 33, flows through the sleeve 44 into the pipe 42. Here it passes the valve 47 and through the sleeve 41 enters the middle shaft 33, from whence the water enters the disks of the middle cooler and is discharged through the duct 34 thereof into the drain-head 39. If it is found necessary to heat the water, this is accomplished by opening valve 51, which is connected with the steam-pipe and preferably has a jet 51', that directs the steam into the end of the shaft of the cooler. When the valve 50 is opened, steam, preferably at substantially atmospheric pressure, will flow through the sleeve 29 into the bore 19' of the heater-shaft 19. From the bore 19' the steam is through holes 23 distributed between the baffle-disks 27 and 28 of all but the last disk upon the shaft. The water of condensation soon fills the disks to about the level of the shaft, and this, because of the rotation of the disks, results in maintaining films of water between the baffle-disks and the inner walls of the hollow or heater disks, so that the steam striking the baffle-plates is almost instantly condensed thereby and by natural expansion. By thus supplying steam between the baffle plates or disks the hot steam is condensed before it can reach the thin walls of the heater-disks 22, and in this manner all danger of scorching the milk is avoided. The water of condensation which collects in the disks flows around the baffle-disks and through the cylindrical portions 26 until it reaches the inner baffle plate or disk of the last disk 22. Having passed this disk, the water, with the little vapor that remains, passes into the space between the baffle-disks of the last plate and from thence escapes through the holes 24 into the discharge-bore 19'' of the shaft. The water of condensation is finally discharged into the head 29. When desired, the coolers may be supplied from separate sources of cooling fluid. In such a case the valve 47 is closed, a cold-water pipe is connected with the valve 48, and the valve 49 is opened and serves as an outlet for the shaft of the end cooler. By opening the valve 52 steam may be allowed to enter all of the disks of the machine, either for the purpose of blowing out the same or for suddenly raising the temperature of the fluid in the compartments. The temperature of the heater-disks 22 may be reduced by admitting water to the shaft 19 from the valve 52. The heating and cooling devices being supplied with steam and water, respectively, and being in rotation, the actual process of pasteurization or any like treatment of milk is as follows: The covers are placed over the compartments, and milk or other liquid is then turned into the first compartment 4 until the milk rises to the by-pass 9, when it will overflow into the next compartment 5 and from that compartment into the by-pass 10 and through the same into the last compartment 6, the discharge from which is through the pipe 11. As the milk enters the compartment 4 it encounters the coolest of the heater-disks—namely, the disk at the discharge end of the heater. From this point the milk slowly flows toward the opposite end of the compartment and the by-pass 9. The rapid rotation of the disks causes the same to carry over films of milk, and in this manner all portions of the body of the milk are at one time or another intimately subjected to the highest temperature of the heater, and the rapid rotation of the heater-disks insures that rapid rise of the temperature of the flowing milk which is required for the extermination of the bacilli, microbes, and other growths therein. As before explained, the temperature of the disks can never rise to the temperature of steam at atmospheric pressure because of condensation; instead said temperature is automatically maintained at the temperature of condensed steam. The vertical deflecting-plates when used prevent any possible unevenness in the flow of milk through the compartments and tend to slightly accelerate the forward flow of the agitated milk. As the milk enters the middle compartment of the machine through the by-pass 9 it encounters the warmest of the cooling-disks—that is, the disk which is nearest the drain or discharge head 39. The temperature of the cooling-disks taken as a whole is very low, being that of cold water or cooled brine, and it is obvious that as the cold disks are rotated rapidly in the bodies of milk, in the middle and end compartments, the temperature of the flowing milk will be rapidly reduced; and, in practice, it is discharged from the pipe 11 at a temperature closely approximating that of the cooling fluid used in the coolers.

A distinct advantage accrues from the employment of the covers of the cooling-compartments, which covers prevent the pollution of the milk from the atmosphere, and particularly from the employment of the cover for the heater-compartment, which insures an even temperature throughout the compartment 4 and practically prevents the evaporation of the milk.

My machine may be employed in various other ways, and I do not confine my invention either to the specific construction herein shown or the uses defined.

Having thus described my invention, I claim as new and desire to secure by Letters Patent—

1. In a pasteurizer or the like, the combination of a plurality of closed compartments in communication, with a rotary heater and a rotary cooler of large area having horizontal axes provided in said compartments respectively for rapidly heating and cooling the liquid flowing through said compartments, and means for rotating said heater and cooler, substantially as described.

2. In a pasteurizer or the like, the heating and cooling compartments, in combination with a cover for said heating-compartment adapted to prevent evaporation from said compartment, means connecting said compartments and a plurality of rotary hollow internally heated and cooled devices provided in said compartments, respectively, substantially as described.

3. In a pasteurizer or the like, a plurality of fluid-compartments suitably connected for the flow of liquid from one to the other, in combination with a heater arranged in one of said compartments, coolers arranged in the other compartments and means for causing the cooling fluid to flow through said coolers toward the point at which the liquid from the heating-compartment enters the first cooling-compartment substantially as described.

4. In a pasteurizer or the like, the plurality of liquid-compartments having diagonally-opposed connecting-passages, in combination with rotary heaters and coolers arranged in said compartments respectively, substantially as described.

5. In a pasteurizer or the like, the connected liquid-compartments in combination with the rotary disk heaters and coolers provided in said compartments and containing tortuous passages for heating and cooling fluids and the walls of the heaters being protected from the direct effect of the heating fluid, substantially as described.

6. In a pasteurizer or the like, the liquid compartment or receptacle in combination with the shaft extending through said compartment, the hollow disks provided upon said shaft, the steam-condensing baffle-disks contained in said disks and means for supplying a heating fluid from said shaft to said disks and discharging the same from the last disk on said shaft, substantially as described.

7. In a pasteurizer or the like, the liquid compartment or receptacle, in combination with a plurality of hollow disks suitably connected, steam-condensing baffle-disks provided in said hollow disks, means for supplying a heating fluid thereto and for discharging the condensed fluid therefrom, substantially as described.

8. The rotary heater for pasteurizers and the like comprising the hollow shaft, the hollow disk provided thereon, means for supplying a heating fluid to said shaft and for discharging the same from said disk on the exterior of said shaft.

9. The rotary heater for pasteurizers and the like, comprising the hollow shaft, the hollow disks provided thereon, means for supplying a heating fluid through said shaft and for discharging the same from said disks on the exterior of said shaft and the steam-condensing baffle plates or disks provided within said hollow disks, as and for the purpose specified.

10. The rotary heater for pasteurizers and the like, comprising a hollow shaft, a plurality of hollow disks provided thereon and suitably connected one with the other, jet-openings provided in said shaft and the steam-condensing baffle plates or disks arranged close to the walls of said disks, as and for the purpose specified.

11. In a pasteurizer or the like, the liquid receptacle or compartment, in combination with the rotary cooler comprising a shaft, a plurality of hollow disks provided thereon and suitably connected one to another, the partition-disks provided within said hollow disks and ducts in the ends of said shafts for supplying and discharging the cooling fluid to and from the first disk and the last disk of the series, substantially as described.

12. The rotary cooler for pasteurizers and the like, comprising the shaft provided with ducts in its ends, in combination with a plurality of hollow disks provided upon said shaft, said ducts communicating with the end disks on said shaft, the cylindrical connections between said disks having passages or openings for the cooling fluid, substantially as described.

13. In a pasteurizer or the like, the liquid receptacle or compartment having inlet and discharge openings at its opposite ends, in combination with a plurality of rotary disks arranged in said compartment and a plurality of deflecting-plates, said deflecting-plates extending from the sides of the compartment and between the several rotary disks and extending substantially to the top of said compartment, as and for the purpose specified.

14. In a pasteurizer or the like, a plurality of liquid-compartments having suitable covers and connected for the flow of liquid from one to the other, in combination with the rotary heater and cooler provided in said compartments, the shafts of said heater and cooler extending through the ends thereof and heating and cooling fluid connections with said shafts for supplying and emptying said rotary devices, substantially as described.

15. In a pasteurizer or the like, the combination with the machine-body, containing a plurality of liquid-compartments in combination with inlet and outlet ducts for the compartments, the by-pass projecting from said body and connecting the compartments, the rotary heater and cooler in said compartments respectively, the shafts thereof, the drain-heads at the ends of said shafts and the fluid-inlet connections with said shafts, substantially as described.

16. In a heater for pasteurizers and the like, the shaft in combination with a hollow disk provided thereon, means for supplying and discharging heating fluid to and from said disk and the condensing baffle-plates provided within said disk and between which the heating fluid is first admitted, substantially as described.

17. The pasteurizer or the like comprising a plurality of liquid-compartments connected for the flow of liquids therethrough, the covers for said compartments, a rotary heater provided in one of said compartments, a rotary cooler provided in another, heating and cooling fluid connections therefor, respectively, and said heater and cooler being in operation only partially immersed in the liquid under treatment, substantially as described.

18. The pasteurizer or the like, comprising a liquid-compartment having inlet and outlet openings for the fluid, a rotary heater provided in said compartment and a cover for said compartment, having an outlet-opening for the escape of gases and filled thereby to exclude air when the machine is in operation, substantially as described.

19. In a pasteurizer or the like, two compartments or spaces, one for heating the liquid and the other for cooling the same, in combination with a heater provided in and substantially filling the first compartment and heated by a fluid which flows longitudinally through said heater, a cooler provided in and substantially filling the other compartment and cooled by fluid which flows longitudinally through said cooler, means for moving said heater and cooler, a liquid-inlet for said first compartment, a liquid-outlet for the other compartment, a connection or duct between the compartments, and said inlet, said connection and said outlet being so arranged that the liquid under treatment flows through the compartments in directions opposite to the flow of the heating and cooling fluids in said heater and said cooler, respectively, substantially as and for the purpose specified.

20. In a pasteurizer or the like, a first compartment or liquid-space, in combination with a second compartment to receive the liquid from the first compartment, a rotary hollow heater arranged in the first compartment and having a suitable discharge opening or outlet at its end, a steam connection to the opposite end of said heater, means within the heater preventing the direct contact of the steam with the internal walls thereof, a rotary hollow cooler provided in the second compartment and having a suitable outlet at its end, a cooling-fluid connection to the other end of the cooler, and the internal walls of said cooler being exposed to the cooling fluid, substantially as described.

21. In a heater for pasteurizers or the like, a hollow disk, in combination with tubular connections, concentric with the disk, for conducting steam and water to and from the same, and means arranged within the hollow disk preventing the direct play of steam upon the internal walls thereof.

22. A heater for pasteurizers or the like, comprising a hollow lens-shaped disk, in combination with tubular inlet and discharge connections therefor, and means within the disk forming water-film spaces upon the inner walls thereof, as and for the purposes specified.

23. In a heater for a pasteurizer or the like, a plurality of hollow disks, mounted upon a suitable shaft, means for supplying steam to the interior of said disks, means for conducting the water of condensation from the disks, and means in each disk for condensing the steam which enters it and for maintaining films of water upon the interior walls of the disks to protect said walls from the direct effect of the steam, substantially as described.

24. In a pasteurizer or the like, two compartments or spaces, connected for the flow of liquid from one to the other, in combination with hollow shafts extending through said compartments, double-walled heating-disks mounted upon one of said shafts, single-walled cooling-disks mounted upon the shaft in the other compartment, and means connected with said shafts for supplying hot and cold fluids thereto, substantially as described.

25. In a pasteurizer or the like, the combination, of the communicating fluid-compartments having an inlet and an outlet respectively, and constituting together a path for a flowing stream of liquid, with a plurality of rotating heating devices, connected together throughout, provided in one of said compartments, a plurality of rotary cooling devices, connected together throughout, provided in the other of said compartments, means for internally heating and cooling said heating and cooling devices respectively, and suitable means for rotating said devices in their compartments, to heat and cool the flowing fluid therein, substantially as described.

26. The rotary heater for pasteurizers and the like, comprising a shaft, in combination with a plurality of hollow disks provided thereon, said shaft being provided with steam-jets for directing steam into said hollow disks, the baffle-disk provided in each hollow disk and having inwardly-turned, flanged edges that substantially overlap said disks, protecting the inner walls of their hollow disks from the direct heat of the steam from said jets, and suitable means for conducting water of condensation from said hollow disks, substantially as described.

In testimony whereof I have hereunto set my hand, in the presence of two witnesses, this 19th day of August, 1902, at Fort Atkinson, Jefferson county, Wisconsin.

THEODORE L. VALERIUS.

Witnesses:
W. W. CORNISH,
H. H. CURTIS.